Feb. 21, 1928.
S. B. DRUCKER
1,660,007
MAYONNAISE MAKING MACHINE
Original Filed Oct. 1, 1926
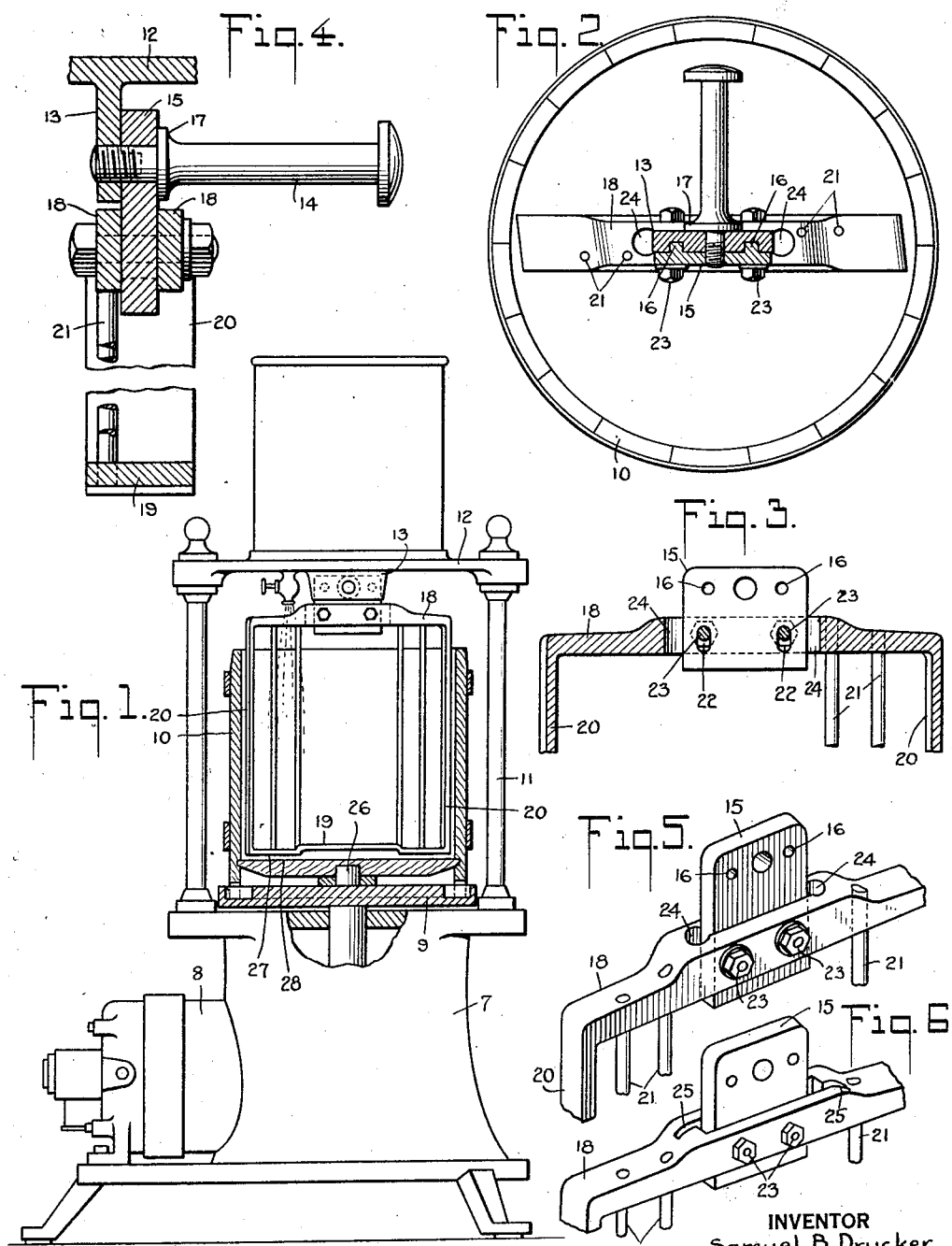
INVENTOR
Samuel B. Drucker
BY
*his* ATTORNEY Patented Feb. 21, 1928.

1,660,007

UNITED STATES PATENT OFFICE.

SAMUEL B. DRUCKER, OF BROOKLYN, NEW YORK.

MAYONNAISE-MAKING MACHINE.

Application filed October 1, 1926, Serial No. 138,979. Renewed July 14, 1927.

This invention relates to mayonnaise making machines.

The object of the invention is to provide means which are simple and efficient for adjustably supporting, holding, and clamping a stationary member employed in connection with a revoluble container for use in making and emulsifying the ingredients required in making mayonnaise.

Other objects of the invention will appear more fully hereinafter.

The invention consists substantially in the construction, combination, location, and relative arrangement of parts, all as will be more fully hereinafter set forth, as shown in the accompanying drawing, and finally pointed out in the appended claims.

Referring to the accompanying drawing,—

Fig. 1 is a view in elevation, parts in vertical central longitudinal section, of a machine for making mayonnaise, and embodying my invention.

Fig. 2 is a view in horizontal section on the line 2, 2, Fig. 1, looking in the direction of the arrows, showing the revoluble container and the stationary member, and means embodying the present invention for efficiently clamping and holding the stationary member with which the revoluble container operates.

Fig. 3 is a broken view in section on the line 3, 3, Fig. 2, looking in the direction of the arrows, showing a portion of the means for adjustably clamping and holding the stationary member.

Fig. 4 is a similar view on the line 4, 4, Fig. 2, looking in the direction of the arrows.

Fig. 5 is a view in perspective showing the upper portion of the stationary member and the clamp plate employed in connection therewith.

Fig. 6 is a view similar to Fig. 5 showing a slightly modified structure embodying the principles of the invention.

The same part is designated by the same reference numeral wherever it occurs throughout the several views.

In carrying out the invention I employ a suitable revoluble container which is axially rotated in any suitable or convenient manner, and into which extends or protrudes a stationary member. In the operation of making mayonnaise the various ingredients are supplied to the container, and by reason of the axial rotations imparted to the container, the centrifugal force imparted to the contents of the container cause such contents to move not only radially with respect to the container but also to be carried around with the container during the latter's axial revolutions. The resulting movements imparted to the contents of the container are impeded and the paths thereof altered by reason of the stationary member protruding into the container, and which is encountered by the whirling contents of the container, thereby thoroughly mixing and emulsifying the bat or batter composed of the ingredients supplied to the container. For efficient operation the machine employing such a revoluble container and cooperating stationary member requires an efficient mounting of the stationary member by which it is clamped and firmly held in stationary relation with reference to the container, but which should be made not only adjustable but also detachable, so that said stationary member may be adjusted to proper position and relation with respect to the container, and also, so that said stationary member may be detached and removed after the work of mixing and emulsification has been completed. It is among the special purposes of my present invention to provide a mounting for the stationary member which permits such adjustment and detachability, but which will firmly and efficiently grip and hold the stationary member in its adjusted position.

Referring to the accompanying drawing,—reference numeral 7 designates a base or stand within which is mounted a suitable motor indicated at 8, through which is rotatively actuated a supporting platform 9. A container 10 is seated at its closed bottom upon the rotatable platform 9, and is constructed in any suitable or convenient manner for engagement with said platform to revolve axially therewith. The present invention, however, is not concerned with the manner of connecting the container with the supporting platform to secure coincident rotation of the container axially with the supporting platform. Connected to and rising from the base 7 are standards 11, upon which is carried a platform 12, which is positioned above the upper open end of the container 10 when the latter is placed in position upon the rotatable platform 9. Depending from the lower side of the stationary platform 12 is a plate or member 13 to which the stationary mixing or emulsifying member of the machine is detachably and adjustably connected. According to the present invention this detachable and adjustable connection is accomplished in the following manner,—the depending plate 13 is formed with a threaded bolt opening to receive the threaded end of a removable hand bolt 14, which is designed to pass loosely through a plate member 15, and to be threaded into the opening in the depending portion 13. The depending portion 13 is also formed with depressions on one face thereof, said depressions being disposed at opposite sides respectively of the clamp bolt 14, and which depressions receive lugs or pins 16 carried by the opposed face or surface of the plate 15. By this construction the plate 15 may be easily and readily applied and clamped to the depending member 13, and in proper and centered relation with respect thereto, by simply applying said plate with the pins 16 thereof seated in the corresponding seats or recesses formed in the depending portion 13, and then applying the clamp bolt 14, a collar or shoulder 17 on which serves to clamp rigidly the plate 15 against the opposed face of the depending portion 13. The parts so far described in the specific structure thereof form no part of my present invention, except in their relation with respect to and their cooperative combination with the other parts of the structure now to be described.

The stationary member of the mayonnaise making machine includes a top member 18, and a bottom member 19, disposed in parallel relation to each other, and formed into a generally rectangular shaped frame, the upper and lower portions 18, 19, of which are connected together by side portions 20, and the intervening rods or members 21. The present invention, however, does not concern itself with respect to the details of structure of the stationary member except in so far as are concerned the means by which said member is adjustably and detachably clamped and held in working position. To this end the clamp plate 15 is designed to constitute such adjustable supporting connections or means. The supporting plate 15 depends into position to engage, or to be engaged by, the upper member 18 of the stationary member of the machine. In the particular form shown, the member 18 is formed with a vertical slot therethrough, through which the plate 15 extends. Said plate 15 is formed with elongated openings 22 therethrough, see Fig. 3, through which pass clamp bolts 23, which bolts also pass transversely through the side walls of the slot in the portion 18 of the stationary member. By reason of the elongated slots 22 in the clamp plate 15, the desired adjustability of the stationary member 18 is secured, and through the clamp bolts 23 the said member is efficiently and firmly clamped to the plate 15 and held thereto. In order to secure an efficient gripping and clamping action, I propose, in accordance with my present invention, to so construct the slot in the member 18 through which the plate 15 extends, as to enable the side walls of said slot to have a more or less spring action under the influence of the clamp bolts 23 when the latter or the nuts thereon are turned up to effect the clamping together of these parts. This spring clamping action may be attained in various ways. In Figs. 2, 3 and 4, I have shown one arrangement, wherein the side edges of the slot through the member 18, through which slot the clamp plate 15 extends, are extended beyond the side edges of the plate 15 into rounded extensions indicated at 24. This imparts a more or less yielding or spring action to the side walls of the slot, and enables said side walls, when drawn towards each other into clamping relation with respect to plate 15, to exert an efficient clamping action thereagainst to hold rigidly and stationarily the member 15. This is important in machines of this character because of the forces imposed upon the stationary member during the operation of the machine in the course of manufacture of mayonnaise therein. Instead of the edges of the slot through the member 18 being formed into rounded extensions, as indicated in Figs. 2, 3 and 4, the same spring clamping action effect may be secured in other ways. For instance, in Fig. 6 I have shown an arrangement wherein kerfs 25 are formed in the body of the member 18 as extensions from the side edges of the slot in which the clamp plate 15 is received. In this case, the kerf 25 at one edge of said slot, is formed parallel with the side edge of the member 18, but closer to one edge of said member 18 than the kerf at the opposite edge of the slot, thereby permitting the side walls of the slot to be more or less resilient to enable said side walls to more efficiently and firmly be drawn together into clamping relation with respect to the clamp plate 15. In some instances I prefer to employ the rounded edge extensions 24 of the slot in the member 18, as this is a somewhat cheaper construction to make. My invention in its broadest scope, however, is not to be limited or restricted in this respect.

The lower edge or end portion 19 of the stationary member of the mixing and emulsifying machine is preferably formed with a central raised portion 26, and an annular edge portion 27, which approaches more closely the surface of the bottom 28 of the container 10. By having this raised annular central portion 26 I am enabled to more effectively initiate the mixing and emulsifying action of the machine, at least at the beginning of the operation of the machine, and particularly where eggs are employed in the manufacture of the mayonnaise, I am enabled to effect a more thorough breaking up and mixture of the ingredients initially supplied to the machine.

From the foregoing description it will be seen that the stationary member of the machine is first adjusted to proper position upon and clamped to the clamp plate 15. Of course this may be done either before or after the latter is clamped by the clamp bolt 14 to the depending supporting portion 13 of the upper support 12. In practice the plate 15 will ordinarily be clamped to the depending portion 13 in the proper centered relation with respect thereto, and then the stationary member 18 adjusted relatively to the plate 15 in the proper relation with respect to the container 10 into which said stationary member extends. When this adjustment is effected the nuts on clamp bolts 23 are properly turned up, thereby causing the side members or walls of the slot in the member 18, through which the plate 15 extends, to form spring clamp jaws to be firmly drawn together into clamping relation with respect to said plate, thereby firmly and efficiently retaining the stationary member 18 in place. When the member 18 is once properly adjusted and clamped to the clamp plate 15 the detachment and removal of the member 18 is easily effected without disturbing the adjustment of said member with reference to clamp plate 15 by simply removing the clamp plate from the depending portion 13 and permitting said clamp plate and the member 18 clamped together to be removed from the container.

I do not specifically claim herein the structure shown in Fig. 6 as the subject matter thereof is claimed in a separate application executed and filed of even date therewith.

The process, involving the use of the apparatus herein disclosed and claimed, is claimed in my co-pending application 550,681, filed April 8, 1922.

Having now set forth the objects and nature of my invention, and various structures embodying the principles thereof, what I claim as new and useful and of my own invention and desire to secure by Letters Patent is,—

1. In a mayonnaise making machine, an emulsifying member having a slot therein, in combination with means to adjustably clamp and rigidly and stationarily hold said member in working position, including a clamp plate arranged to extend through said slot in varying positions, said slot having extensions at its edges, means to clamp the side walls of said slot towards each other and upon said plate, and means to detachably support said clamp plate.

2. In a mayonnaise making machine, an emulsifying member having a slot through its upper part, a clamp plate having elongated openings transversely therethrough, said plate adapted to be received in said slot, clamp bolts arranged to pass through the side walls of said slot and the elongated openings in said plate to clamp said parts together, the side edges of said slot having extensions to constitute the side walls of said slot spring clamping jaws, and means to detachably support said clamping plate.

3. In a mayonnaise making machine, an emulsifying member having a slot through its upper part, a clamp plate having elongated openings transversely therethrough, said plate adapted to be received in said slot, clamp bolts arranged to pass through the side walls of said slot and the elongated openings in said plate to clamp said parts together, said slot being wider than the width of said plate and having its end edges bored out to constitute the side walls of said slot spring clamping jaws, and means to detachably support said clamping plate.

4. In a mayonnaise making machine, a container mounted for axial rotation, in combination with a frame extending into said container, said frame having upper and lower members and members connecting them, said upper and lower members extending diametrically with respect to said container, a central raised portion for said lower member, and means to detachably clamp and hold said frame stationary when in working position.

5. In a mayonnaise making machine, an emulsifying member having a slot therein in connection with means to adjustably clamp and rigidly and stationarily hold said member in working position, including a complementary member arranged to extend through said slot in varying positions, said slot having extensions on its edges, means to clamp the side walls of said slot towards each other and upon said complementary member.

6. In a mayonnaise making machine, an emulsifying member having an engaging portion at its upper part, a clamp plate having elongated openings transversely therethrough, said plate adapted to be received in said engaging portion of said emulsifying member, clamp bolts arranged to pass through said engaging portion and the elongated openings in said plate to clamp said parts together and means to detachably support said clamp plate.

In witness whereof I have hereunto signed my name this 30th day of September, 1926.

SAM'L B. DRUCKER.